Jan. 7, 1936.  A. F. McNISH  2,026,694
GLASS FORMING MACHINE
Filed Oct. 26, 1934    5 Sheets-Sheet 1

Inventor:
Alexander Francis McNish
By Williams, Bradbury, McCaleb & Hinkle
Attys.

Jan. 7, 1936.  A. F. McNISH  2,026,694
GLASS FORMING MACHINE
Filed Oct. 26, 1934   5 Sheets-Sheet 2

Inventor:
Alexander Francis McNish
By
Williams, Bradbury, McCaleb & Hinkle
Attys.

Jan. 7, 1936.　　　　A. F. McNISH　　　　2,026,694
GLASS FORMING MACHINE
Filed Oct. 26, 1934　　　5 Sheets-Sheet 3

Inventor:
Alexander Francis McNish
By
Williams, Bradbury, McCaleb & Hinkle
Attys.

Jan. 7, 1936.　　　　A. F. McNISH　　　　2,026,694
GLASS FORMING MACHINE
Filed Oct. 26, 1934　　　5 Sheets-Sheet 4

Inventor:
Alexander Francis McNish
By
Williams, Bradbury, McCaleb & Hinkle
Attys.

Jan. 7, 1936.　　　A. F. McNISH　　　2,026,694
GLASS FORMING MACHINE
Filed Oct. 26, 1934　　　5 Sheets-Sheet 5
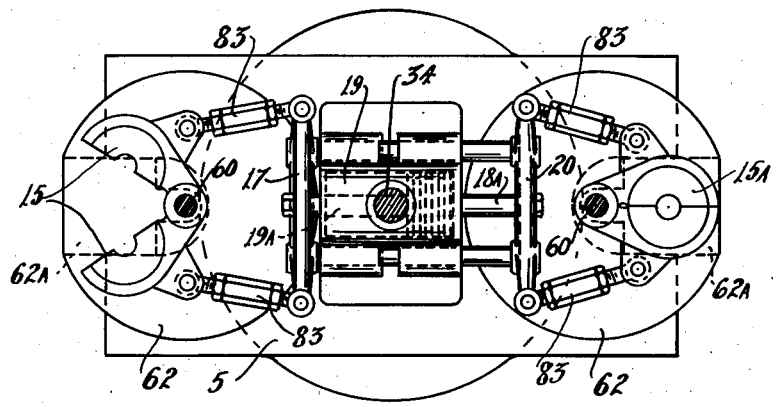
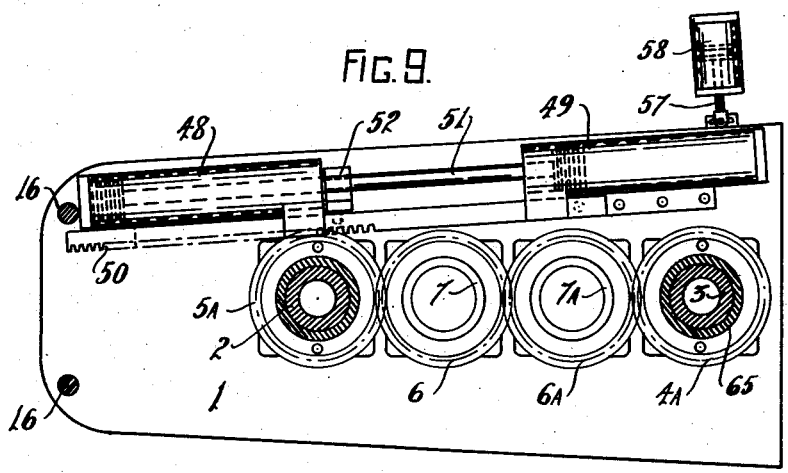
Inventor:
Alexander Francis McNish
By
Williams, Bradbury, McCaleb & Hinkle
Attys.

Patented Jan. 7, 1936

2,026,694

UNITED STATES PATENT OFFICE 2,026,694

GLASS FORMING MACHINE

Alexander Francis McNish, Perth, Scotland

Application October 26, 1934, Serial No. 750,037
In Great Britain November 1, 1933

21 Claims. (Cl. 49—5)

This invention relates to machines for forming glass bottles or other glass hollow-ware of the kind in which a charge of glass is gathered by suction into a blank mould and transferred from the blank mould to a finishing mould.

The invention consists in a machine of the kind described having blank moulds mounted on a rotary table which is oscillated through part of a circle to move one blank mould on the table from a gathering position to a transfer position and to simultaneously return another blank mould on the table from a transfer position to a gathering position.

The invention further consists in a machine of the kind described having intergeared rotary tables for the blank moulds and finishing moulds respectively and characterized by means for oscillating said tables through part of a circle to move a blank mould from a gathering position to a transfer position and vice-versa and for simultaneously moving a finishing mould into and out of the transfer position.

The blank mould table is preferably fitted with a single pair of blank moulds successively movable into and out of a common gathering position.

The blank moulds may either move into a common transfer position, in which case they are set at 180 degrees to each other and the table is oscillated through 180 degrees, or they may be set at an angle of less than 180 degrees to each other to travel to different transfer positions. In the former case the machine will conveniently be constructed as a twin-table machine having a single finishing mould table intergeared with a single blank mould table and each table having a single pair of moulds thereon, one blank mould feeding one finishing mould and the other blank mould feeding the other finishing mould. If the blank moulds are not at 180 degrees to each other, the machine may be constructed as a triple-table machine, one blank mould table being intergeared with a pair of finishing mould tables and the tables being oscillated to successively move the blank moulds from a common gathering position into and out of different transfer positions, and to simultaneously move finishing moulds successively into and out of the transfer positions to cause one blank mould to feed a finishing mould on one finishing mould table, and to cause the other blank mould to feed a finishing mould on the other finishing mould table.

The bottle or other article is preferably blown in the finishing mould while the latter is stationed at the transfer position.

In order that the blank moulds may gather at a different position from that at which the glass is severed from the preceding gather, the blank mould is preferably caused to follow the flow of glass in the gathering basin during the gather and the shearing operation is effected at a point removed from the initial gathering position. For this purpose a to-and-fro movement is imparted to the blank mould at the gathering basin and this may be effected by reciprocating the blank mould table across the front of the gathering basin.

The invention enables any of the operations of gathering, initial blowing of the blank or parison, and opening of the blank mould to be timed differently for the different blank moulds, and likewise the operations of finish blowing, cooling and removal of the finished article can be differently timed for different finishing moulds, so that different sized articles can be manufactured at the same time on a single machine.

The finishing moulds are preferably oscillated to traverse the finishing mould from the transfer position to a position at which the blown article is engaged by a removing device which removes the bottle before the finishing mould again reaches the transfer position. The removing device may be mounted upon the finishing mould table to oscillate with it. In the case of a twin-table machine, the finishing mould table may be fitted with a pair of removing devices arranged to deliver alternately to opposite sides of the machine. Preferably the removing device is arranged to remove the finished article during the return movement of the finishing mould to the transfer position and shortly before it reaches such position.

The accompanying drawings illustrate the general features of a glass forming machine according to the present invention.

Fig. 8 is a plan view of the finishing mould table and mould opening and closing mechanism.

Fig. 9 is a plan view of the base plate and mould tables oscillating gearing.

Figure 1:
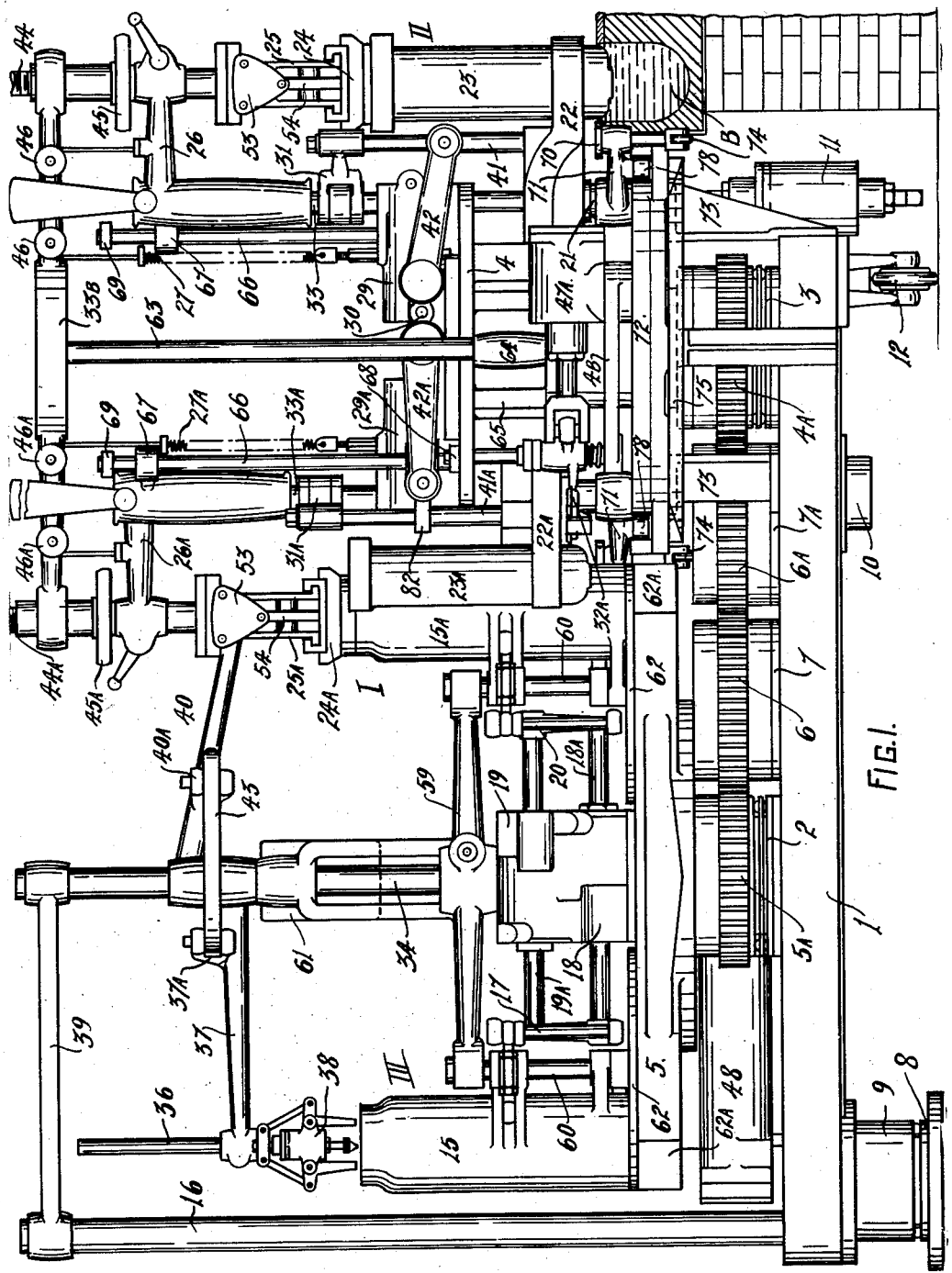
Fig. 1 is an elevation and Fig. 2 a plan of the machine.

The machine illustrated comprises a base plate 1 which is carried at one end upon a thrust bearing 9 mounted to turn on a lower bearing or column 8. The other end of the base plate 1 rides on the floor on rollers 12 (Fig. 1) near the gathering basin B (shown in section in Fig. 1) of a glass furnace. The end of the base plate 1 near the gathering basin is moved to and fro in front of the gathering basin by means of the piston rod 57 of a hydraulic or pneumatic cylinder 58 (Figs. 2 and 9) to allow the parison moulds to gather at a different position from that at which the glass is sheared from the preceding gather and to follow the flow of glass in the basin during the gather.

Mounted on the base plate 1 is the gearing for oscillating parison and finishing mould tables 4 and 5 through part of a circle or through 180 degrees. For this purpose the finishing mould table 5 turns with a gear wheel 5A mounted to turn on a bearing 2 on the base plate 1. The gear wheel 5A gears with a gear wheel 6 mounted on a bearing 7 on the base plate 1 and the gear wheel 6 gears with a gear wheel 6A mounted on a bearing 7A on the base plate 1. The gear wheel 6A gears with a gear wheel 4A which turns with the parison mould table 4 on a centre column 65 turning on a lower bearing 3. The gear wheel 5A derives its oscillatory motion from a rack 50 (Fig. 9) to which is fixed a crosshead 52 fixed to the piston rod 51 of a pair of opposed hydraulic or pneumatic cylinders 48, 49 to which pressure fluid is supplied to reciprocate the piston rod 51. The cylinders 48 and 49 are fixed to the base plate 1.

Figure 2:
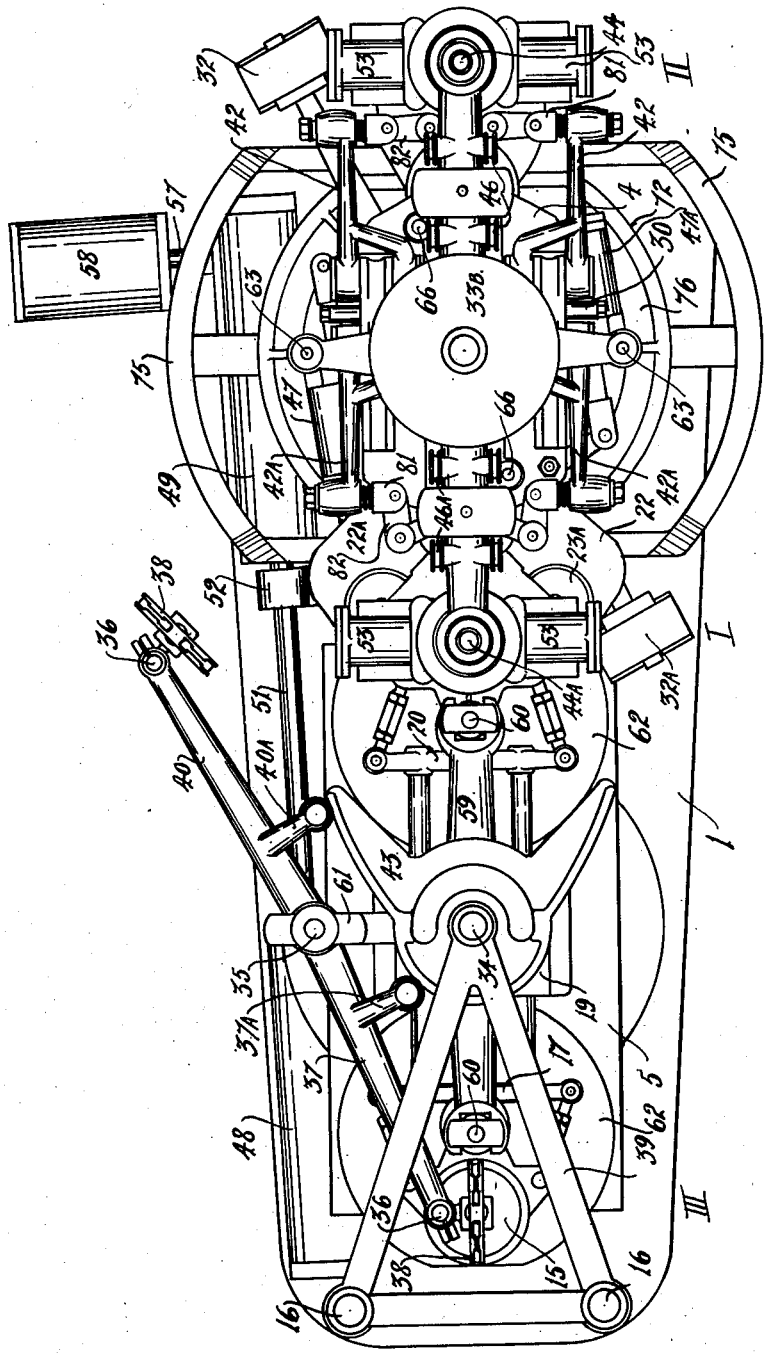

Mounted on the finishing mould table 5 are cylinders 18 and 19 for opening and closing a pair of finishing moulds 15 and 15A (Figs. 1 and 8). The mould 15 is opened and closed by a crosshead 17 connected thereto and the mould 15A is opened and closed by a crosshead 20 connected thereto, the crosshead 17 being operated by the piston rod 19A of cylinder 19 and crosshead 20 by piston rod 18A of cylinder 18. Mounted in a bearing on the top of the cylinder 19 is also a centre post 34 supported at its upper end in a steadying bracket 39 carried by a pair of pillars 16 on the base 1. The centre post 34 carries a bridge 59 the ends of which support the upper ends of the hinge pin 60 of the finishing moulds 15 and 15A. Supported from one side of the bridge 59 in a bracket 61 secured to the side of the bridge is a shaft 35 for carrying the finished bottle removing gear which comprises a pair of arms 37 and 40, each carrying a bottle remover 38 of any convenient type at its outer end and each having a tappet arm 37A, 40A which coacts with a cam 43 fixed to the centre post 34. Each bottle remover 38 is vertically adjustable upon a spindle 36 carried by arm 37 or 40. The finishing moulds 15 and 15A are each mounted on adjustable base plates 62 on the table 5. To this end each base plate 62 has on its underside a block 62A slidable into or out of a slot in the table 5 and fixed in position by any suitable means.

Mounted on the parison mould table 4 are vertical rods 33 and 33A (Figs. 1 and 4) connected at the top by a cross beam 33B supported by a pair of posts 63 mounted in bearing 64 on the centre column 65 supporting the table 4. Below the table 4 on the rods 33 and 33A are slidable sleeves 21 and 21A carrying at their lower ends rollers R which can coact with the rams of hydraulic or pneumatic cylinders 10 and 11 which serve to raise and lower the divided parison moulds 23 and 23A, the latter being carried by pairs of arms 22 and 22A pivoted on the sleeves 21 and 21A. Upon the table 4 are mounted hydraulic or like cylinders 29 and 29A for opening and closing the parison moulds, the piston rods of cylinders 29 and 29A being both connected to a crosshead 30 to which are attached arms or links 42, 42A carrying at their ends forks 81 connected by links 82 to spindles 41, 41A which are attached at their lower ends to the arms 22 and 22A. The reciprocation of the crosshead 30 through the connections 42, 81 and 82 opens and closes the parison moulds.

The spindles 41 and 41A are connected at their upper ends to upper arms 31 and 31A which turn on the rods 33 and 33A.

The divided neck ring moulds and blow heads 24 and 24A are carried by units 25 and 25A carrying the neck-ring opening and closing gear. The units 25 and 25A are supported laterally from the rods 33 and 33A by brackets 26 and 26A movable up and down said rods and counterbalanced thereon by balance springs 27 and 27A, the cords of which pass over pulleys 46 and 46A on the cross beam 33B.

Figure 7:
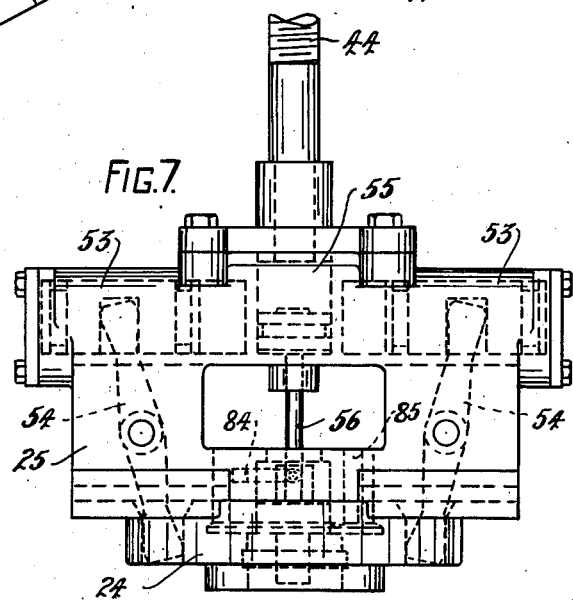
Fig. 7 is a side view of the neck mould mechanism.

The neck ring moulds and blow heads 24, 24A and the units 25, 25A which carry them are suspended from screw-threaded shafts 44 and 44A passing through the brackets 26, 26A and adjusted vertically by hand wheels 45 and 45A screw-threaded on the shafts 44 and 44A. As shown in Fig. 7, 53 are cylinders for operating the neck ring moulds through levers 54, and 55 is a cylinder for operating a plunger 56 which forms a depression in the neck of the parison.

Figure 6:
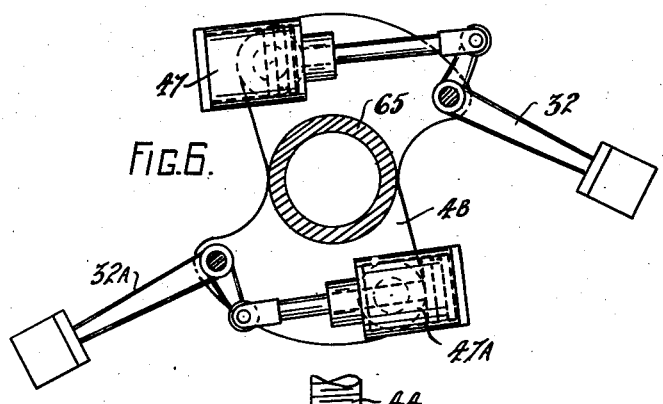
Fig. 6 is a plan view of the brackets carrying the shear arms and their operating mechanism.

32 and 32A (Fig. 6) are shear arms controlled by hydraulic or like cylinders 47 and 47A carried below the table 4 on a support 4B so as to turn with the table 4.

The operation of the machine is as follows:—

Figure 3:
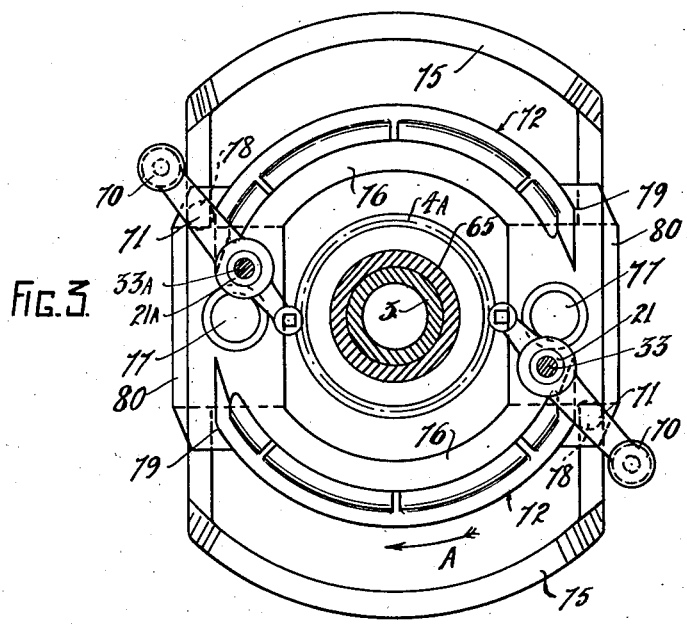
Fig. 3 is a plan view of the parison cam paths and parts of the operating mechanism.
Figure 4:
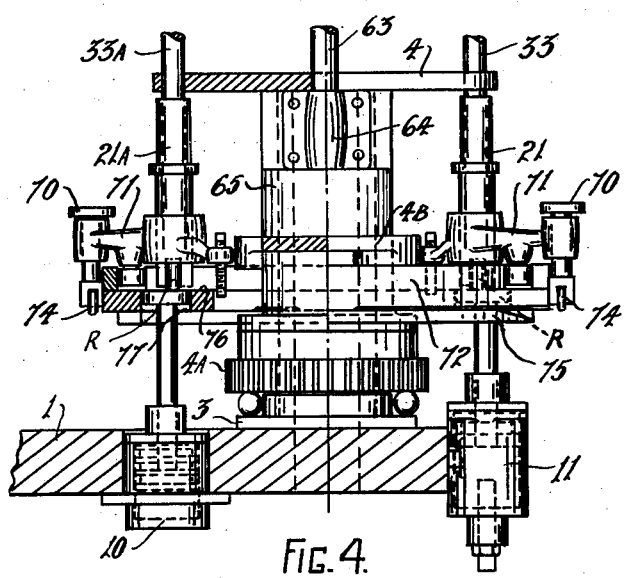
Fig. 4 is a part sectional elevation of the parison cam paths, parison mould table and parts of the operating mechanism.
Figure 5:
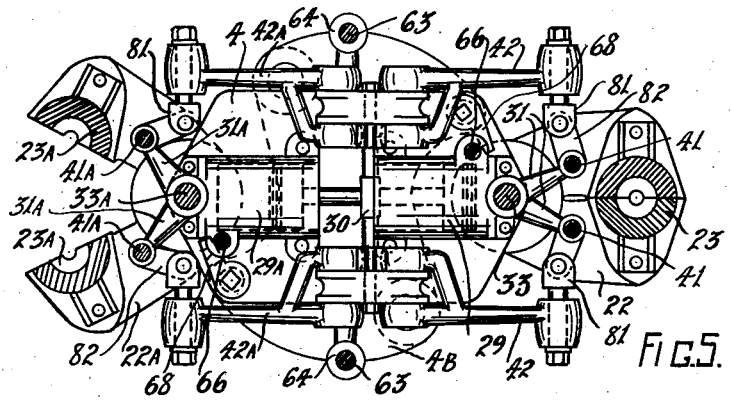
Fig. 5 is a plan view of the parison mould table and some of its associated mechanism.

The parts are all shown in the drawings with parison mould 23A in the transfer position except Figs. 3 and 4 which show the mould slightly displaced from that position.

The parison from the parison mould 23A is transferred at transfer position marked I (Figs. 1 and 2) to finishing mould 15A and the parison from parison mould 23 is likewise transferred at transfer position I to finishing mould 15. The tables 4 and 5 are oscillated by admitting pressure fluid to cylinders 48 and 49 to drive piston rod 51 in one direction, thereby through rack 50 rotating the gearing 5A, 6, 6A and 4A. It will now be assumed that the tables 4 and 5 have been oscillated thereby so that parison mould 23A travels to the gathering position marked II (or the end of its stroke in the direction of arrow A Fig. 3). During its travel to position II, the parison moulds are supported by the rollers R running on fixed horizontal tracks 76 supported above the base plate 1 on standards 73. Apertures 77 in the tracks 76 allow the rollers R to be received therein at the end of the travel of the parison moulds in either direction when the tables 4 and 5 cease to rotate, so that when parison mould 23A reaches position II, its roller R is lowered through the aperture 77 by means of II and allows sleeve 21A to descend with the parison mould arms 22A, so that parison mould 23A descends in the gathering position II into the basin B. Suction is applied to the parison mould 23A in the usual manner through passage 84 in the blow head to fill the mould with glass and the plunger 56 is depressed by admitting pressure fluid to one end of cylinder 55 to form a depression in the neck of the parison. During this operation, the base plate 1 is rocked on its pivot 8 by the piston rod 57 and cylinder 58 to cause the parison mould 23A to follow the flow of glass in basin B. When the mould 23A has been filled, the cylinder 11 raises the roller R and thus raises the mould arms 22A to raise the parison mould 23A clear of the glass in the basin B and when the parison mould 23A has reached its full height and the cylinder 58 has rocked the base plate 1 through its limit of travel to move the parison mould 23A to the other end of the basin B, the shear arm 32A is operated by admitting pressure fluid to one end of cylinder 47A and shears the glass from the bottom of mould 23A. At this moment both the finishing moulds 15 and 15A are closed and the parison mould 23 and neck ring mould 24 are open. Rods 66 slidable through eyes 67 on the brackets 26, 26A engage catches 68 on the upper end of the spindles carrying the shear arms 32, 32A so as to prevent the shear arms being operated before the parison moulds are raised to their full height. The catches are released by the rods 66 being raised when the parison moulds are nearing their raised position by the eyes 67 engaging collars 69 on the upper ends of the rods 66.

After the shearing operation the tables 4 and 5 are returned through half a revolution by admitting pressure fluid to cylinders 48 and 49 to return piston rod 51 and at the commencement of this motion the base plate 1 rocks back to its original position. During the travel of the parison mould 23A from position II to position I, the plunger 56 (Fig. 7) is withdrawn from the neck ring mould 24A by admitting pressure fluid to the other end of cylinder 55 and the shear arm 32A is withdrawn from the bottom of the parison mould by admitting pressure fluid to the other end of cylinder 47A and replaced by a mould bottom plate 70 which is moved into position to cover the opening in the bottom of the parison mould. The mould bottom plate 70 is carried by an arm 71 pivoted to revolve on the sleeve 21, the arm 71 carrying a roller 78 adapted to engage an arcuate cam 72 integral with the horizontal track 76. The arcuate cam 72 terminates at each end in an abrupt shoulder 79 opposed to a guide plate 80. When the table 4 is stationary, roller 78 is positioned between guide plate 80 and shoulder 79 and holds mould bottom plate 70 clear of parison mould. When table 4 commences to rotate, roller 78 runs off shoulder 79 on to cam 72. This swings out the arm 71 on sleeve 21 to carry the mould bottom plate 70 under the parison mould. A roller 74 secured to the end of a spindle carrying the mould bottom plate 70 is adapted to engage a horizontal track 75 inclined at each end to hold the plate 70 against the bottom of the parison mould. Compressed air is also applied for a short period to the interior of the parison through passage 85 in the blow head in known manner. At about this time the neck ring 24 on the other parison mould 23 is closed by admitting pressure fluid to the inner end of cylinder 53 and shortly thereafter the parison mould 23A is opened, which operation at the same time closes the parison mould 23. The opening of the one mould 23A and closing of the other mould 23 is effected by admitting pressure fluid to cylinder 29A to operate cross-head 30, arms 42 and links 81. The mould bottom plate 70 remains in position to steady the parison in the mould 23A after the latter has been opened and is withdrawn to move it clear of the finishing mould 15A when the parison mould 23A arrives at position I by passing between shoulder 79 and guide plate 80 at position I.

The above operations can be timed to take place at any desired moment during the travel of the mould 23A from position II to position I, but should preferably follow each other in the above-mentioned sequence. When the parison mould 23A reaches position I, the tables 4 and 5 again cease to rotate and parison mould 23 is now at the gathering position II ready to go through the same operations as previously described for the parison mould 23A. The parison mould 23A arrives open at position I and is allowed to descend by the roller R being lowered through the aperture 77 by means of the cylinder 10 to lower the parison into the open finishing mould 15A which is then closed in manner hereafter described and compressed air is applied to the blow head of mould 23A to blow the bottle in mould 15A. In the meantime the parison mould 23 has taken a gather of glass. The neck ring mould 24A is now opened by admitting fluid to the outer ends of cylinders 53 to leave the blown article in the mould 15A and both parison moulds are lifted to their full height by admitting pressure fluid to the cylinders 10 and 11 and the tables 4 and 5 are ready to rotate again through one half of a revolution. The closing of the finishing mould at the transfer position I is effected by admitting pressure fluid to one end of cylinder 19 thereby moving out crosshead 20 which through links 83 closes the mould halves. While the parison mould 23A is returning to position II and taking another gather, the bottle from the first gather is cooling in the closed finishing mould 15A. While parison mould 23A is returning to position II finishing mould 15A is moving to position III and shaft 35 carrying the bottle removers swings around fixed cam 43 until tappet 40A engages the circular part of cam 43, when the bottle remover 38 is positioned over mould 15A and is caused by any convenient means to engage the bottle. The parison mould 23A having gathered another charge, it is lifted at the gathering basin and returns to position I as before. During its return to position I and preferably about midway in its travel, the finishing mould 15A is opened by admitting pressure fluid to the other end of cylinder 19 and the finished bottle is taken from the mould 15A by the bottle remover 38 swinging out to remove the bottle so soon as the tappet 40A of arm 40 coacts with the projecting part 43A of cam 43. So soon as the bottle remover 38 has removed the finished bottle, the mould 15A returns to position I ready to receive the next parison from mould 23A, thus completing the cycle of operations of the machine. Both parison moulds 23 and 23A go through similar operations, and likewise both finishing moulds 15 and 15A go through similar operations, but they may be timed independently of each other, so that bottles of two different sizes can be made at one and the same time on the one machine.

I claim:

1. A glass forming machine comprising a rotary blank mould table, suction blank moulds on said table, means for oscillating said table through part of a circle to move one mould on the table from a gathering position to a transfer position and to simultaneously return another mould on the table from a transfer position to a gathering position, a plurality of finishing moulds, means for transferring the charges from the blank moulds to the finishing moulds and means for imparting a to-and-fro movement to the blank moulds at the gathering position.

2. A glass forming machine having intergeared rotary tables, suction blank moulds on one table and finishing moulds on the other table, means for oscillating said tables through part of a circle to move a blank mould from a gathering position to a transfer position and vice-versa and for simultaneously moving a finishing mould into and out of the transfer position and means for imparting a to-and-fro movement to the blank moulds at the gathering position.

3. A glass forming machine according to claim 2 having a single pair of blank moulds on the blank mould table, said blank moulds being successively movable into and out of a common gathering position.

4. A glass forming machine having intergeared rotary tables, a single pair of diametrically opposite suction blank moulds on one table, and a single pair of diametrically opposite finishing moulds on the other table, means for oscillating said tables through 180 degrees to successively move the blank moulds into and out of a common gathering position and into and out of a common transfer position, and for simultaneously moving the finishing moulds successively into and out of the transfer position, to cause one blank mould to feed one finishing mould and to cause the other blank mould to feed the other finishing mould and means for imparting a to-and-fro movement to the blank moulds at the gathering position.

5. A glass forming machine having a rotary blank mould table, suction blank moulds thereon, a rotary finishing mould table, finishing moulds on said finishing mould table, gearing interconnecting the tables, means for oscillating said tables in unison through part of a circle to move each blank mould from a gathering position to a transfer position and vice-versa, said blank moulds travelling to different transfer positions, and said oscillating means simultaneously moving a finishing mould into and out of each transfer position so as to cause each blank mould to feed an associated finishing mould and means for imparting a to-and-fro movement to the blank moulds at the gathering position.

6. A glass forming machine according to claim 1 having means for blowing the glass in the finishing mould while the latter is stationed at the transfer position.

7. A machine according to claim 2 in which the finishing mould remains temporarily stationary at the transfer position, means being provided for blowing the glass in the finishing mould while the latter remains in the transfer position.

8. A machine according to claim 1 having means for traversing the blank mould during the gather from an initial gathering position to a shearing position.

9. A machine according to claim 1 having suction means for gathering charges of glass into the blank moulds, means for initially blowing the charges of glass in the blank mould, means for releasing the charges from the blank mould, and timing mechanism whereby any of the operations of gathering, initial blowing and release of the charge are differently timed for different blank moulds.

10. A machine according to claim 2 having opening and closing finishing moulds, means for blowing charges of glass in the finishing moulds, and timing mechanism whereby the operations of opening and closing the finishing moulds and blowing the charges therein are differently timed for different finishing moulds.

11. A machine according to claim 2 having a removing device for engaging the blown article after the finishing mould has moved from the transfer position and for removing the article before the finishing mould again reaches the transfer position.

12. A machine according to claim 2 having a removing device mounted upon the finishing mould table to oscillate with it, and means for actuating said removing device to cause it to engage the blown article after the finishing mould has moved from the the transfer position and to cause it to remove the article before the finishing mould again reaches the transfer position.

13. A machine according to claim 4 having the finishing mould table fitted with a pair of removing devices adapted to engage the blown articles and to deliver them alternately to opposite sides of the table.

14. A machine according to claim 2 having a removing device arranged to remove the finished article from the finishing mould during return movement of the latter to the transfer position.

15. A glass forming machine comprising a base pivotally mounted at one end and supported at its other end for reciprocation across the front of a gathering basin, a blank mould table and a finishing mould table rotatably mounted on said base, gearing interconnecting said tables, means for oscillating said tables through part of a circle, a pair of moulds on each table, means on each table for opening and closing said moulds, means on the blank mould table for raising and lowering the moulds thereon, neck ring moulds and suction and blow heads mounted on the blank mould table for cooperation with the blank moulds, and shearing devices carried by the blank mould table, and means for reciprocating the base about its pivot to move the base in one direction while the tables are at rest and to return the base during the commencement of the oscillatory movement of the tables.

16. A glass forming machine according to claim 15 having removing devices mounted upon the finishing mould table and means for actuating said devices to engage and remove the finished articles.

17. A glass forming machine according to claim 15 having a pair of diametrically opposite moulds on each table, means for oscillating the tables through 180 degrees to move the blank moulds from a gathering position to a diametrically opposite transfer position and vice-versa and to reciprocate the finishing moulds through 180 degrees from the transfer position, a pair of removing devices carried by the finishing mould table, and means for actuating said devices in succession to cause each said device to engage an article in a finishing mould at a position diametrically opposite the transfer position and to remove said article during the return movement of the article towards the transfer position.

18. A glass forming machine according to claim 15 having a mould bottom plate adapted to be placed beneath the parison mould during its travel from the gathering position to the transfer position.

19. A glass forming machine having intergeared rotary tables, suction blank moulds on one table and finishing moulds on the other table, means for oscillating said tables through part of a circle to move a blank mould from a gathering position to a transfer position and vice-versa and for simultaneously moving a finishing mould into and out of the transfer position, means for imparting a to-and-fro movement to the blank mould at the gathering position and means for shearing the glass in the mould from the gather after the mould has traveled in one direction from an initial gathering position and before it returns thereto.

20. A glass forming machine comprising a rotary blank mould table, suction blank moulds on said table, means for oscillating said table through part of a circle to move one mould on the table from a gathering position to a transfer position and to simultaneously return another mould on the table from a transfer position to a gathering position, a plurality of finishing moulds, means for transferring the charges from the blank moulds to the finishing moulds, means for reciprocating the blank mould table across the front of a gathering basin to cause the blank mould at the gathering station to follow the flow of glass in the basin during the gather and means for shearing the glass in the mould from the gather at a point removed from the initial gathering position.

21. In a glassware forming machine, a partible neck mould including a pair of sections movable toward and away from each other along a straight line, means for imparting movement to the sections including a pair of horizontal piston motors, and levers providing connection between the motors and neck mould sections.

ALEXANDER FRANCIS McNISH.